Feb. 11, 1958 J. H. RUHL 2,822,595
RETRACTABLE SEAT BELT BUCKLE
Filed Oct. 2, 1956 2 Sheets-Sheet 1
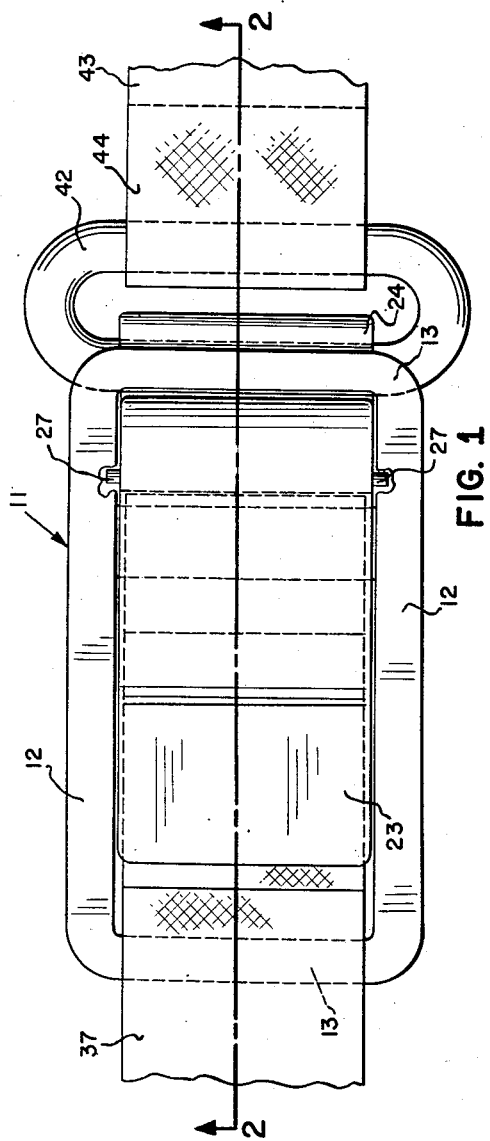
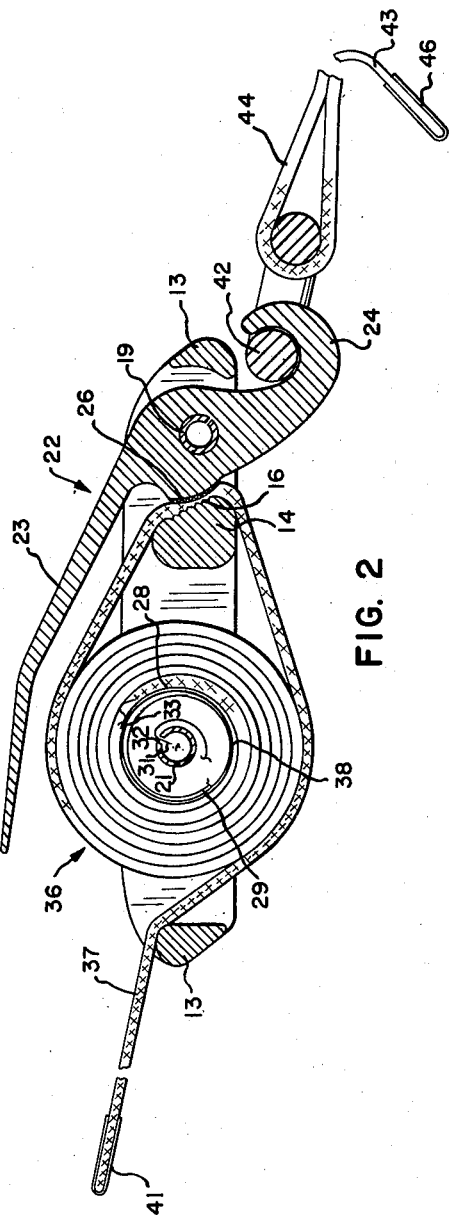
J. H. RUHL
INVENTOR.
BY E. C. McRae
J. B. Faulkner
J. H. Oster
ATTORNEYS Feb. 11, 1958 J. H. RUHL 2,822,595
RETRACTABLE SEAT BELT BUCKLE
Filed Oct. 2, 1956 2 Sheets-Sheet 2
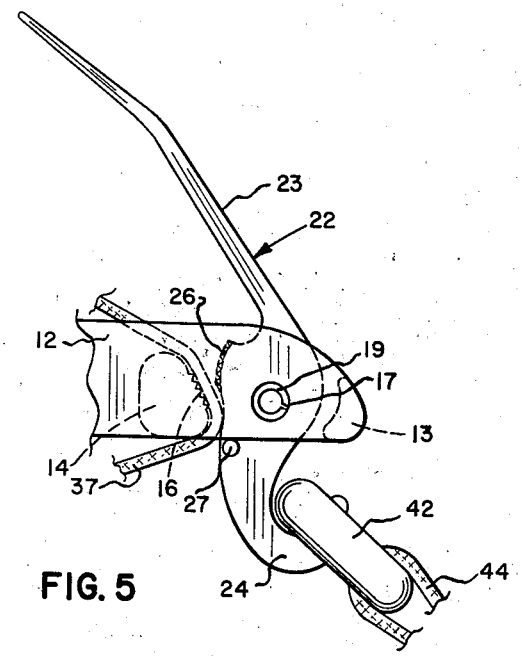
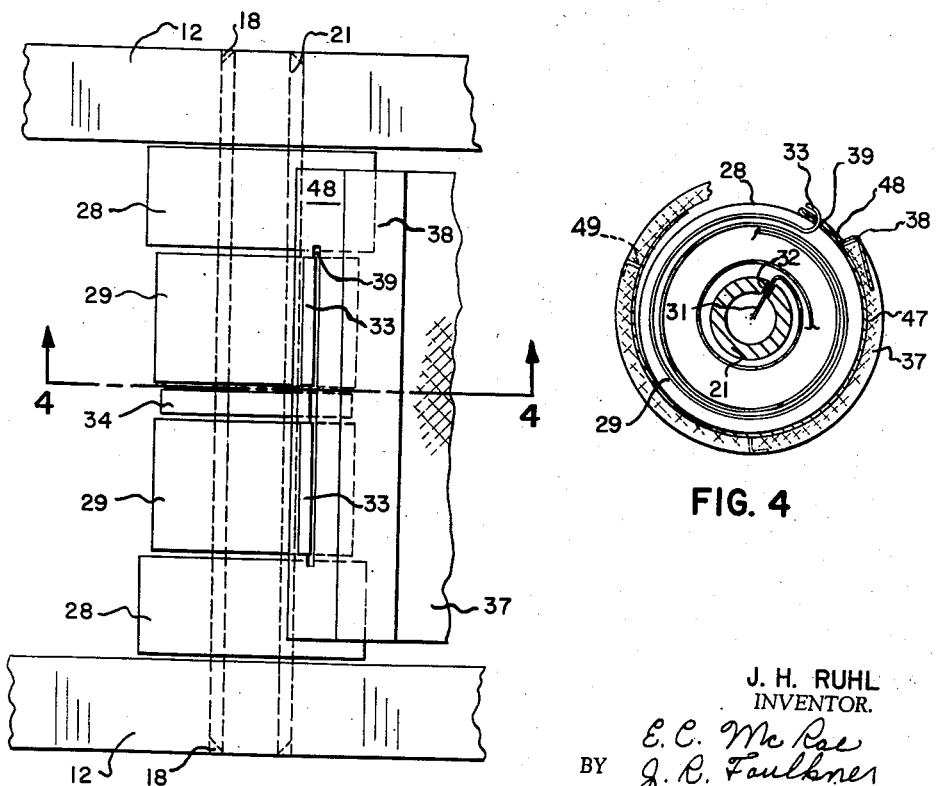
J. H. RUHL
INVENTOR.
BY E. C. McRae
J. R. Faulkner
F. H. Oster
ATTORNEYS United States Patent Office 2,822,595
Patented Feb. 11, 1958

2,822,595

RETRACTABLE SEAT BELT BUCKLE

John H. Ruhl, Lincoln Park, Mich., assignor to Ford Motor Company, Dearborn, Mich., a corporation of Delaware Application October 2, 1956, Serial No. 613,407

9 Claims. (Cl. 24—170)

This invention relates to seat belt buckles and more particularly to a retractable type seat belt which may be used to restrain passengers in airplanes, motor vehicles, and the like. Prior to this invention it was common practice to have a seat belt of predetermined length secured to an anchor at one end and to a buckle at the other end. A cooperative engaging belt of a definite length was also secured to an anchor and was hand threaded through the buckle and tightened until such time as the occupant was securely fastened. Upon the release of the belt buckle, the buckle and loose belt end were left in their respective position upon the seat. In motor vehicles particularly, seat belts because of their excessive lengths tend to fall out the door, get caught in the door jam, become lodged between the seats and fall on the floor where they are subjected to trampling and soiling. It is, therefore, an object of this invention to provide a seat belt buckle of a retractable type which will effectively retract one of the belts within the confines of the buckle.

Another object is to provide a retractable seat belt buckle which will permit quick engagement and release of the belt.

Still another object is to provide a retractable seat belt buckle which permits a required length of belt to be used without having the free and unused portions of the belt extending through the buckle.

A further object is to provide a spool type retractable belt buckle which upon proper locking will not place a stress upon the spool or winding mechanism.

Still a further object is to provide a retractable belt buckle which will automatically wind a belt upon the release of the locking mechanism.

Other objects and advantages of this invention will become more apparent when considered in connection with the accompanying drawings in which:

Figure 1 is a plan view of an assembled seat belt buckle embodying the applicant's invention;

Figure 2 is a cross section view taken on the plane indicated by line 2—2 of Figure 1;

Figure 3 is an enlarged fragmentary plan view of the spool and winding portion of the buckle;

Figure 4 is a cross sectional view taken on the plane indicated by line 4—4 of Figure 3; and Figure 5 is a fragmentary side elevational view of the latch in the release position.

Referring now to the drawings, there is provided a closed rectangular frame 11 having parallel sides 12 greater in length than the parallel ends 13. A transversely disposed jaw 14 integral with the long sides 12 is provided near one of the short sides 13 and has an angled serrated gripping face 16. The face 16 is angled rearwardly and upwardly away from the near short side 13. A pair of laterally spaced apart apertures 17 and 18 are disposed in the sides 12 medially of the gripping face 16 and one short side 13, and the jaw 14 and the other short side 13. The aligned apertures 18 are located on a higher horizontal plane than the apertures 17. Journaled in the apertures 17 and 18 are a pair of split pins 19 and 21 respectively which span the rectangular opening within the frame 11 and define a forward and rearward pivot respectively.

A latch generally indicated at 22, and being almost as wide as the rectangular opening in the frame 11, is pivotally mounted to the split pin 19 and comprises a manually operable rearwardly extending gripping handle 23 located above the frame 11 and a downwardly extending forwardly open hook extension 24. Handle 23 and extension 24 are integral with a hub which is provided with an arcuate gripping face 26 oppositely located to the face 16. A pair of stop pins 27 are disposed adjacent the rearward edges of the hook extension 24 and are adapted to contact the underside of the frame side member 12 for a purpose to be described later.

Inwardly adjacent the rollers 28 are a pair of flat coiled torsion springs 29 with the inner convolution 31 confined within the transverse slot 32 of the split pin 21 and the outer convolution bent back upon itself to form a U-shaped retaining edge 33. A spacer 34 is centrally located on the pin 21 and separates the springs 29. It is to be understood that a variety of spring means may be employed to retract the belt 37 into the confines of the frame 11 without departing from this invention.

Generally indicated at 36 is a seat belt assembly comprising a conventional belt 37 made of appropriate "nylon," cotton webbing and the like and a belt retainer 38 effectively secured to the end of the belt. Retainer 38 is composed of an arcuately formed inner section 47 substantially surrounding the rollers 28 and bent back upon itself to form a lip 48. A transversely aligned attachment slot 39 is provided in the lip 48 for attaching the retainer 38 to the U-shaped ends 33 of the springs 29. A plurality of stamped upstanding pointed projections 49 on the inner section 47 are adapted to pierce the belt 37 and are then bent in a conventional manner to secure the belt to the retainer. There are numerous and obvious attachment methods available in the art of which the applicant has shown only one. In the wound position of the springs 29, the belt 37 has been uncoiled about the rollers 28 in a clockwise position extending forwardly and downwardly between the serrated faces 16 and 26, reversed in direction to underlie the coiled belt. It is then brought through the inside of the frame 11 and taken to the anchoring means (not shown). Clip 41 at the end of the belt keeps the edge of the belt from unraveling.

Upon the release of the belt, the springs 29 unwind and retract counterclockwise the belt 37 which is long enough to completely circle the occupant. Because the belt buckle after retracting will be near its anchoring point, appropriate recesses or means, such as in the side of the seat, may be employed to keep the buckle readily accessible to the occupant. The securement of the occupant is completed by providing a short belt 43 which is secured at one end to a conveniently provided floor anchor (not shown). An anchoring ring 42 is secured to the other end of the belt 43 by forming a closed loop 44 about one side of the ring 42. The secured end of the belt 43 has a U-shaped slip 46 to prevent raveling. In the use of the belt, the handle 23 is moved in a clockwise direction as shown in Figure 5 permitting the belt 37 to be uncoiled off the rollers 28 and the belt buckle moved laterally to the right about the person's body. Binding of the belt when it is being withdrawn from the spool is prevented by the transversely aligned stop pins 27 in the hook extension 24 striking the underside of the frame side members 12 and preventing further lateral movement of the hook extension 24 in the direction of the belt. Other means may be employed in preventing the hook 24 from striking the belt 37 such as by providing a build up of material on the upper side of the handle which would strike the forward edge of the frame. When the handle 23 is moved in its clockwise open position, the anchoring ring 42 may be inserted within the confines of the hook and the buckle moved laterally to the left to effectively tighten the belt. Upon the effective tightening of the belt 37, the handle 23 will be moved counterclockwise so that the serrated gripping face 26 will clamp the belt 37 against the face 16. Because of the tension on the hook extension 24 the unit serves as a self engaging toggle type friction lock. It can be seen from Figure 2 that tensions on the belt 37 are taken by the clamping faces 16 and 26 and the rear frame. The retracting mechanism is hidden by the handle 23 and does not receive any torsional stress or pull. Anchoring ring 42 is kept within the hook 24 by the forward lower edge of the frame side 13 until such time as the handle 23 is moved clockwise, thus releasing the belt 37 and permitting the link 42 to be removed from the hook.

It is to be understood that the invention is not to be limited to the exact construction shown and described, but that various changes and modifications may be made without departing from the spirit and scope of the invention as defined in the appended claims.

What is claimed is:

1. A retractable seat belt buckle comprising a frame, having end and side members, a jaw connected to said side members, a pivot located on each side of said jaw respectively, a latch pivotally mounted to one of said pivots and having a gripping surface facing said jaw, coiling means including at least one roller journaled on said other pivot, a belt, retracting means for yieldably connecting said belt about said roller said means urging said belt to coil about said roller, the uncoiled end of said belt being threaded downwardly between the jaw and the gripping surface and rearwardly thereof between the coiled belt and the frame and attachment means on said latch for securing said buckle to a complementary belt for encircling an occupant.

2. The structure defined by claim 1 which is further characterized in that said areas between the end and side members, the jaws, pivots, latch and roller constitute apertures and that said jaw is integral with said side members near one of the end members, that said pivots comprise a pair of split pins and that said belt retracting means comprises a spring secured in one of said split pins.

3. The structure defined by claim 1 which is further characterized in that the retracting means comprise at least one coiled flat spring having its inner convolution secured in one of said split pins and the other convolution of said belt formed with a substantially U-shaped lip, and said belt having a belt retainer comprising a leading edge having a transverse slot through which the U-shaped lip is secured.

4. The structure defined by claim 1 which is further characterized in that said jaw has a rearwardly upwardly extending serrated clamping face and that said latch gripping surface is spherically formed whereby selective movement of the latch will move said spherically formed surface in an arcuate path about said pivot, said attachment means on said latch comprising a downwardly and forwardly extending hook extension and said complementary belt having a closed anchored link securable on said hook extension.

5. The structure defined by claim 1 which is further characterized in that the attachment means on said latch comprises a forwardly open hook extending below and slightly forward of the end frame member in the locked latch position, and said complementary belt comprises an anchored belt of a short predetermined length, a closed link secured to the loose end of said complementary belt, the space between said end member and said hook being substantially less than the thickness of said closed link, when said latch is closed and greater than said link when the latch is open, whereby tension on said complementary belt moves said latch gripping surface into greater gripping contact with the belt effectively squeezing said first named belt between said gripping surface and said jaw and preventing said link from being disengaged from said hook.

6. A retractable seat belt buckle comprising a rectangular frame including side and end members, a transversely aligned jaw integral with said members and separating the interior of said frame into a small forward and a large rearward section, said jaw having a slanted rearward serrated clamping face, a transverse split shaft on each side of said jaw medially disposed between said jaw and said frame end members, movable latching means including an upstanding handle, a depending hook extension and a gripping face, journaled on said forward shaft and movable about said shaft, said gripping face being disposed in opposed alignment with said clamping face, a plurality of rollers rotaatbly mounted to said second transverse shaft, retracting spring means mounted on said second shaft adjacent said rollers, a belt securing means including a retainer for attaching said belt to said retracting spring means, said spring retracting means normally urging said belt circumferentially around said rollers in a coiled position when said latching means are in the released position, limit means on said latching means for limiting the maximum release position of said latching means and cooperative belt means including an anchor ring for securement to said hook extension.

7. The structure defined by claim 6 which is further characterized in that said handle is bent medially of its ends and effectively hides said coiled belt, and said retracting spring means comprises a plurality of flat coiled springs inwardly adjacent the rollers and having their respective inner convolutions secured in the split pin located in the large rearward section and having their respective outer convolutions reversely bent to form a retaining lip, said belt securing means comprising a leading edge having a transverse slot secured on said retaining lips of said springs and said limit means comprising a pair of outwardly extending transverse pins on said latch engageable with said frame side members.

8. The structure defined by claim 6 which is further characterized in that the depending hook extension is open forwardly and substantially underlies the forward end frame member in the release position of the handle, said cooperative belt means including an anchored belt shorter in length than said other belt and having a rectangular shaped link secured to the loose end of said complementary belt, said space between said hook and said frame being substantially greater than said link when said latch is in the release position, said hook extension being movable in an arcuate path forward and upward when the latch is in a closed position and decreasing said space between the underside of said end member and said hook to substantially less than the height of said link, said hook extending slightly forwardly of said end frame member whereby tension on said hook extension moves the handle rearwardly squeezing said first mentioned belt between said clamping face and said gripping face.

9. A retractable seat belt comprising a closed elongated box-like frame, a serrated gripping jaw transversely positioned within said frame, a pair of split pins defining a transverse pivot axis fore and aft of said jaw, a latch journaled on the forward pivot axis, said latch including a rearwardly extending medially bent handle, a depending link-securing hook and an arcuately formed clamping face oppositely positioned to said jaw, a pair of axially aligned outwardly extending limit pins secured to said hook beneath the frame and adapted to strike the frame when the maximum pivotal release position of the latch has been reached, a pair of spaced apart cylinder-like rollers journaled on the aft split pin adjacent the frame, a pair of spaced apart flat coiled springs inwardly adjacent the rollers and secured in a nonrotatable manner to said split pin, a spacer journaled on said aft split pin medially of said springs, said springs having their outer convolution arcuately rearwardly formed into retaining fingers, a long belt, a hook-on-type retainer fixedly secured to the end of said long belt, said retainer being affixed to the retaining fingers of said springs when said springs are in a wound condition, said belt being coiled about said rollers in the retracted position as the springs unwind, the uncoiled end of the belt being sufficiently long enough to pass between the jaw and the clamping face, underlie the coiled portion of the belt in reverse contact relationship and extend outwardly between the frame and the coiled portion of the belt a sufficient distance to be affixed to a secured anchor, a cooperative short length belt having one end affixed to a secured anchor and having the loose end looped about one side of a closed link, said link being manually insertable in said hook when said latch is in an open position whereby tension on either of the belts will operatively close said latch and compress the long belt between the jaw and the clamping face.

No references cited.